United States Patent [19]

Shadbolt, Jr.

[11] Patent Number: 4,836,143

[45] Date of Patent: Jun. 6, 1989

[54] PORTABLE LIVESTOCK HANDLING PANEL

[76] Inventor: George W. Shadbolt, Jr., 217 Maverick, Gordon, Nebr. 69343

[21] Appl. No.: 153,342

[22] Filed: Feb. 8, 1988

[51] Int. Cl.$^4$ .............................................. A01K 1/02
[52] U.S. Cl. .................................................... 119/20
[58] Field of Search .................................... 119/20, 27

[56] References Cited

U.S. PATENT DOCUMENTS

| | | |
|---|---|---|
| 1,348,343 | 8/1920 | Zimmerman . |
| 1,596,078 | 8/1926 | Clay . |
| 1,764,584 | 6/1930 | Tarrier . |
| 2,581,318 | 1/1952 | Bartlett ................................ 119/20 |
| 3,105,462 | 10/1963 | Miller .................................. 119/20 |
| 3,204,606 | 9/1965 | Parr et al. ........................... 119/20 |
| 3,215,118 | 11/1965 | Behlen ................................. 119/20 |
| 3,469,822 | 9/1969 | O'Brien ............................... 256/25 |
| 3,651,851 | 3/1972 | Curtis ................................. 119/20 |
| 4,134,363 | 1/1979 | Stock .................................. 119/27 |

Primary Examiner—Robert Peshock
Attorney, Agent, or Firm—Zarley, McKee, Thomte, Voorhees & Sease

[57] ABSTRACT

A portable livestock handling panel comprising plurality of horizontally extending side members having vertically disposed end members secured to the opposite ends thereof. A pair of connector elements are secured to each of the members and are adapted to have a rod member extending therethrough so that the ends of the panel member may be joined to other panel members through the use of the rod to create any desired corral or holding pen configuration.

5 Claims, 2 Drawing Sheets

PORTABLE LIVESTOCK HANDLING PANEL

BACKGROUND OF THE INVENTION

Portable livestock handling panels are commonly used to create temporary holding areas or corrals for cattle, horses, etc. The conventional portable livestock panels normally consist of upstanding panel members which may be selectively detachably secured to other panels to create the desired corral configuration. However, the connecting devices which extend from the ends of the panels only permit the panels to be constructed in a predetermined arrangement since the connecting members are rigidly secured to the panel members.

It is therefore a principal object of the invention to provide an improved livestock handling panel.

A further object of the invention is to provide a device of the type described wherein the panel has selectively vertically movably connectors at its ends which may be vertically moved to enable the panels to form any desired configuration.

Still another object of the invention is to provide a device of the type described wherein an elongated rod is utilized to collectively connect the ends of the panel.

These and other objects will be apparent to those skilled in the art.

SUMMARY OF THE INVENTION

Figure 1:
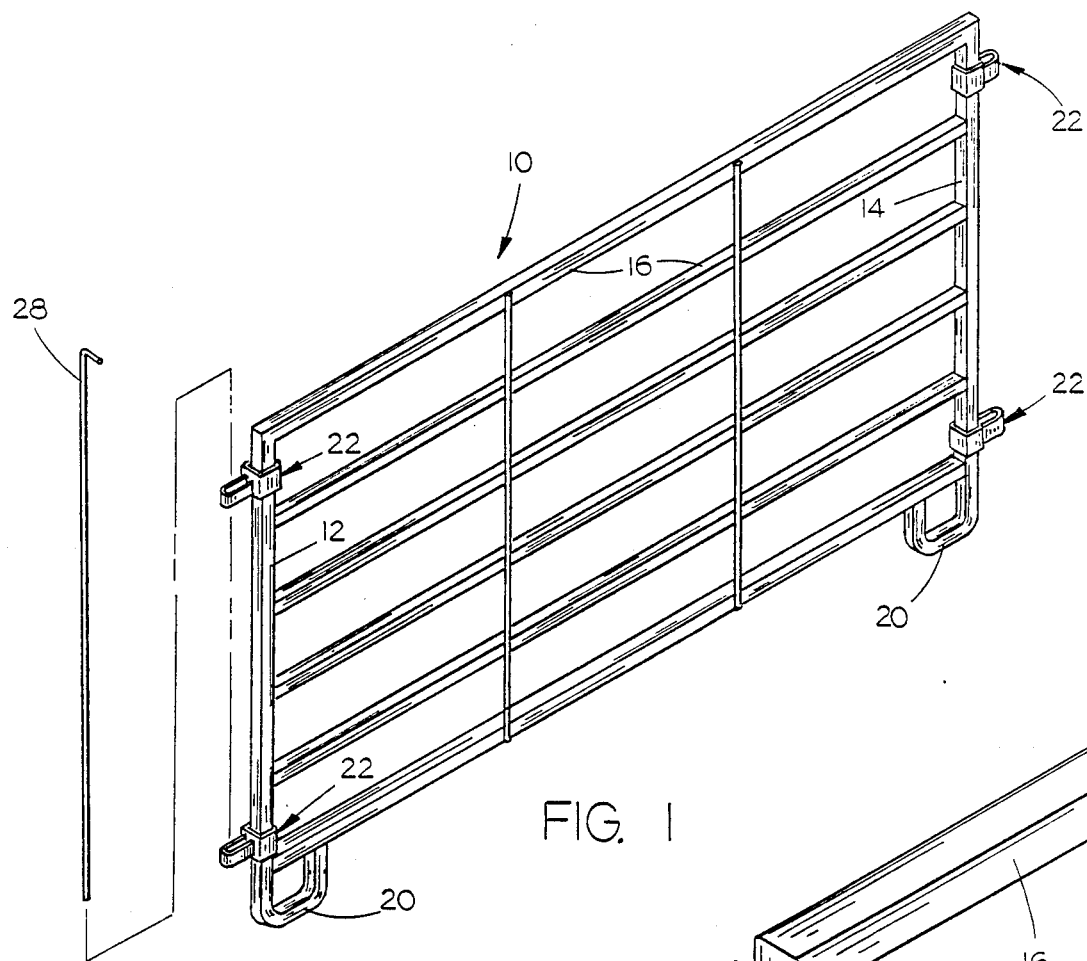
FIG. 1 is a perspective view of the panel of this invention.

The livestock handling panel of this invention comprises an upstanding panel member comprised of horizontally spaced-apart end members having a plurality of horizontally extending bar members or the like extending therebetween in a vertically spaced relationship. Each of the end members of the panel are provided with a pair of selectively vertically movable connectors which are adapted to have a rod or the like extending therethrough to enable the ends of the panel to be selectively connected together. The connecting members permit the panels to be connected together in an end-to-end relationship, transverse relationship or other angular relationship so that the desired holding area or corral configuration may be created.

DESCRIPTION OF THE PREFERRED EMBODIMENT

The portable livestock handling panel of this invention is referred to generally by the reference numeral 10 and comprises a pair of upstanding end members 12 and 14 having a plurality of horizontally extending side members 16 extending therebetween. If desired, vertically extending braces may be utilized. It should be noted that the lower ends of the end members 12 and 14 are bent upon themselves to form a U-shaped portion 20 at their lower ends which enable the panels to be easily slidably moved along the ground.

Each of the end members 12 and 14 are provided with a pair of selectively vertically movable connector elements 22 provided thereon as seen in the drawings. Each of the connector elements 22 includes a sleeve portion 24 which is selectively vertically movably mounted on the end members between the side members 16 as illustrated. A U-shaped portion 26 extends laterally outwardly from the sleeve portion 24 in the same plane as that of the panel 10 as seen.

Figure 4:
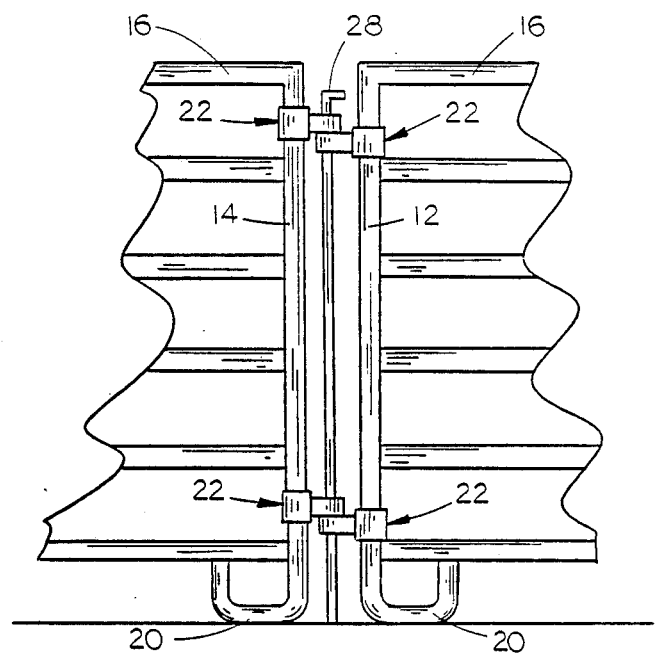
FIG. 4 is partial side view illustrating the manner in which a pair of panel members are secured together.

The panels may be arranged in an end-to-end fashion as seen in FIG. 4 by simply positioning the panels in the end-to-end relationship and vertically moving the connector elements 22 so that the connector elements on one of the panels 10 will be positioned above or below the connector elements 22 on the adjacent end panel. When the connector elements 22 are so positioned, an elongated rod 28 is extended downwardly through the U-shaped portions 26 of the connector elements 22 so that the panel members will be maintained in position. The panel members may also be joined together in any other desired configuration such as illustrated in FIG. 2 or in other angular relationships.

Figure 5:
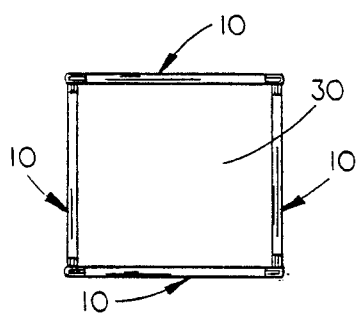
FIG. 5 is a planned view illustrating four of the panel members being connected together.
Figure 6:
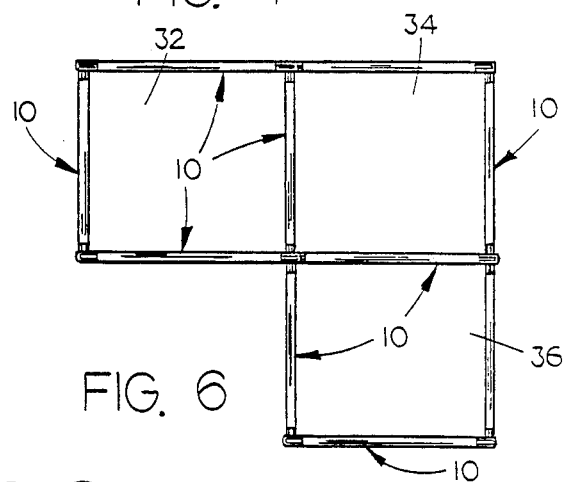
FIG. 6 is a view similar to FIG. 5 except that a large number of the panels have been secured together to create three separate holding areas.
Figure 7:
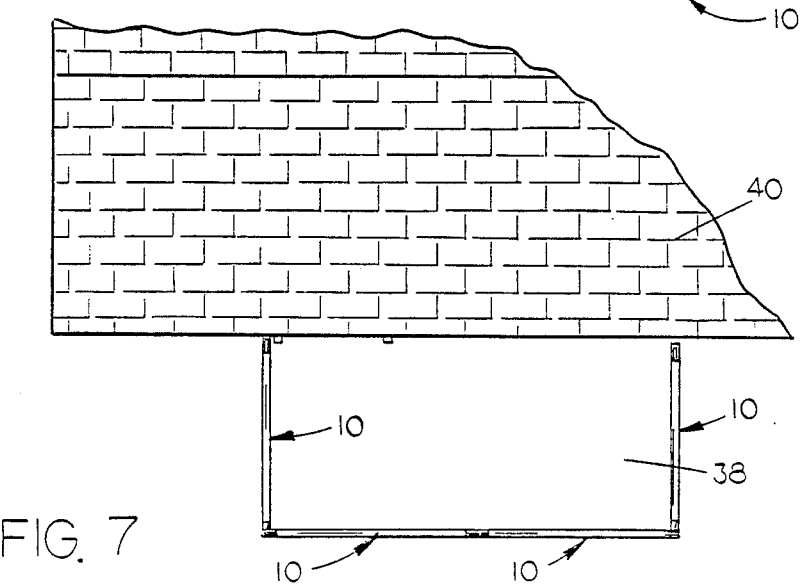
FIG. 7 is a planned view illustrating the manner in which plurality of the members may be secured together to provide a temporary enclosure or corral adjacent the side of the building.

The paneled member may be joined as illustrated in FIG. 5 to create a square corral referred to generally by the reference numeral 30. FIG. 6 illustrates plurality of the panel members being joined as illustrated to create three separate corral or holding areas 32, 34 and 36. FIG. 7 illustrates the manner in which a temporary corral or holding area 38 may be created adjacent the side of a building 40. As seen in FIG. 7, a pair of the panel members 10 are secured together in an end to end fashion with panel members 10 extending at right angles to the opposite ends thereof to create a large rectangular corral or holding area 38.

Figure 2:
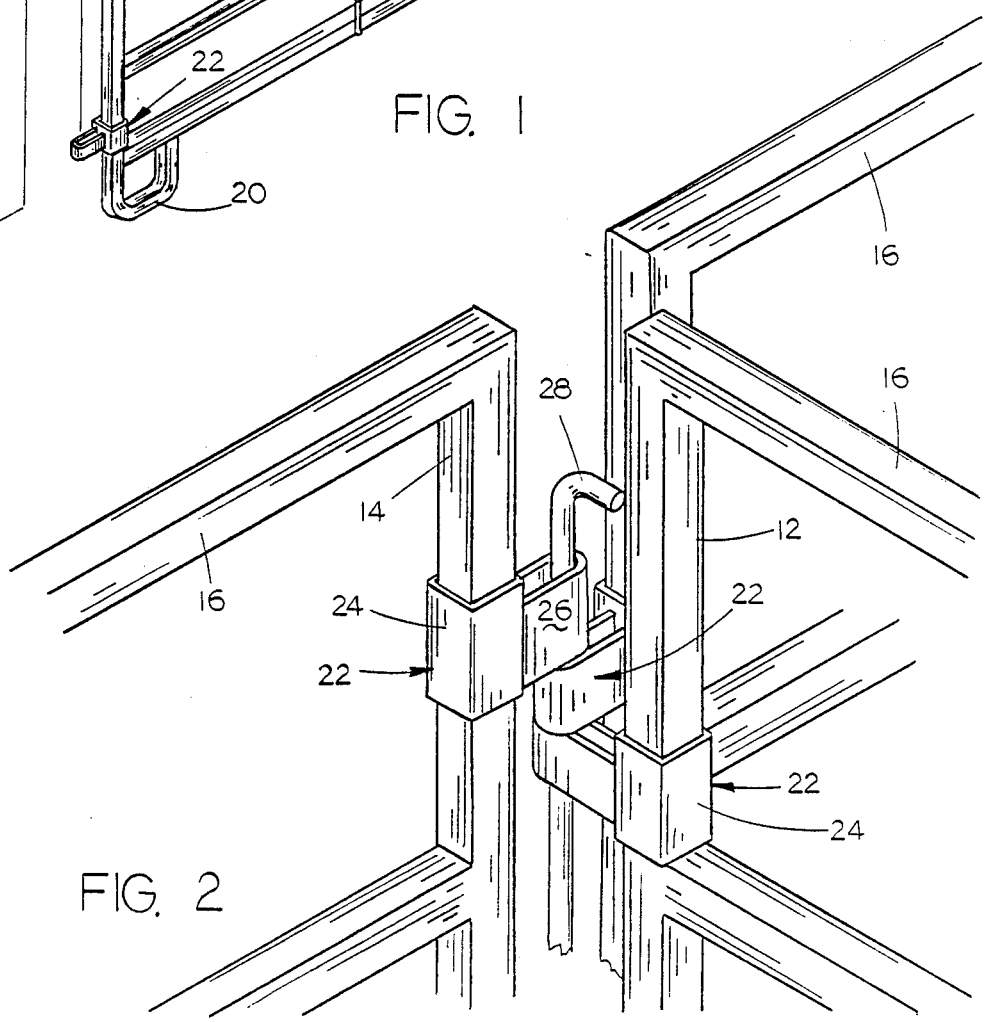
FIG. 2 is a perspective view illustrating the manner in which three of the panels are secured together.
Figure 3:
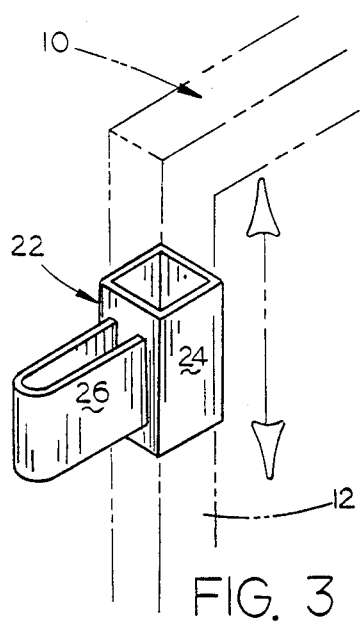
FIG. 3 is perspective view illustrating the manner in which the connectors are vertically moveably mounted on one end of the panel member.

The versatility of the panels is achieved inasmuch as the connector elements 22 are selectively vertically movably mounted on the end members 16 so that the connector elements 22 may be vertically moved upwardly or downwardly to accommodate the connector elements from the adjacent panel such as seen in FIG. 2. The panels of this invention are quickly and easily secured together in a variety of different configurations all of which are made possible through the unique connecting elements 22 provided on the end members. Although the drawings illustrate that the preferred embodiment is that in which the end members 12 and 14 have a square tubular configuration with the sleeve portions 24 also having a square tubular configuration, the end members 12 and 14 as well as the sleeve portions 24 could be of the cylindrical tubular configuration if so desired.

Thus it can be seen that a novel portable livestock handling panel has been provided which accomplishes at least all of its stated objectives.

I claim:

1. A portable livestock handling panel comprising,
   first and second, spaced-apart upstanding end members having upper and lower ends, a plurality of horizontally disposed, vertically spaced side members secured to said end members and extending therebetween, each of said end members having at least first and second connector members selectively vertically movably positioned thereon which extend horizontally outwardly therefrom, each of said connector members comprising a sleeve means which is loosely connected to the associated end member for a freely slidable vertical mount, and a U-shaped member secured thereto and extending outwardly therefrom which is adapted to receive a vertically disposed rod means therein whereby a plurality of the panels may be secured together in an end-to-end relationship or in substantially any other angular relationship with respect thereto.

2. The panel of claim 1 wherein said connector members extend from said end members in a plane parallel to the plane of said panel.

3. The panel of claim 1 wherein said end members have a square tubular cross-section.

4. The panel of claim 1 wherein each of said end members are provided with skid portions at their lower ends.

5. The panel of claim 1 wherein each of said end members extends downwardly past the lower-most horizontal member and forms a U-shaped skid portion which will support the panel on the ground.

* * * * *